United States Patent
Jia

(10) Patent No.: US 12,039,767 B2
(45) Date of Patent: Jul. 16, 2024

(54) SUBJECT DETECTION METHOD AND APPARATUS, ELECTRONIC DEVICE, AND COMPUTER-READABLE STORAGE MEDIUM

(71) Applicant: GUANGDONG OPPO MOBILE TELECOMMUNICATIONS CORP., LTD., Dongguan (CN)

(72) Inventor: Yuhu Jia, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 194 days.

(21) Appl. No.: 17/742,735

(22) Filed: May 12, 2022

(65) Prior Publication Data
US 2022/0270345 A1    Aug. 25, 2022

Related U.S. Application Data

(63) Continuation of application No. PCT/CN2020/122618, filed on Oct. 22, 2020.

(30) Foreign Application Priority Data

Nov. 12, 2019  (CN) .......................... 201911099501.9

(51) Int. Cl.
G06V 10/26   (2022.01)
G06T 7/215   (2017.01)
G06V 10/25   (2022.01)

(52) U.S. Cl.
CPC ............ G06V 10/267 (2022.01); G06T 7/215 (2017.01); G06V 10/25 (2022.01); *G06V 2201/07* (2022.01)

(58) Field of Classification Search
CPC ...... G06V 20/41; G06V 20/46; G06V 10/764; G06V 20/58; G06V 20/49; G06V 20/40;
(Continued)

(56) References Cited

U.S. PATENT DOCUMENTS

2011/0142283 A1   6/2011 Huang et al.
2011/0164149 A1 * 7/2011 Sugisawa ................. G06T 1/60
                                                                      382/103

(Continued)

FOREIGN PATENT DOCUMENTS

CN   101170683 A   4/2008
CN   101908140 A   12/2010
(Continued)

OTHER PUBLICATIONS

International Search Report and Written Opinion dated Jan. 21, 2021 in International Application No. PCT/CN2020/122618. English translation attached.
(Continued)

*Primary Examiner* — Nizar N Sivji
(74) *Attorney, Agent, or Firm* — Sheppard, Mullin, Richter & Hampton LLP

(57) ABSTRACT

A subject detection method is disclosed. A moving object is detected on an image to obtain a moving object region, candidate regions are obtained by sliding a sliding box on the image, a first region is determined. The first region is one of candidate regions and contains a part of the moving object region with a largest area. A proportion of the first region is obtained, a size of the first region is adjusted based on the proportion to obtain a second region, a proportion of the second region is obtained. The first region is replaced with the second region, the proportion of the first region is replaced with the proportion of the second region, and it is returned to adjusting the size of the first region until a
(Continued)

number of iterative adjustments reaches a threshold, a region obtained by the last adjustment is determined as a target region.

20 Claims, 6 Drawing Sheets

(58) Field of Classification Search
CPC ...... G06V 10/40; G06V 20/00; G06V 20/695; G06V 10/267; G06V 10/25; G06V 2201/07; G06V 10/62; G06V 40/10; G06V 20/42; G06V 40/20; G06T 2207/10016; G06T 7/215
See application file for complete search history.

(56) References Cited

U.S. PATENT DOCUMENTS

| | | | |
|---|---|---|---|
| 2012/0105606 | A1 | 5/2012 | Kim |
| 2015/0348251 | A1 | 12/2015 | Wu et al. |
| 2016/0210525 | A1* | 7/2016 | Yang ................. G06V 10/32 |
| 2017/0262727 | A1 | 9/2017 | Kozuka et al. |
| 2020/0219269 | A1* | 7/2020 | Zhang ................. G06T 7/248 |
| 2021/0117684 | A1* | 4/2021 | Chaudhury ........ G06V 20/52 |
| 2022/0109788 | A1* | 4/2022 | Geissler ............. H04N 23/61 |
| 2022/0398823 | A1* | 12/2022 | El-Sana .............. G06V 10/761 |

FOREIGN PATENT DOCUMENTS

| | | |
|---|---|---|
| CN | 102637293 A | 8/2012 |
| CN | 103077534 A | 5/2013 |
| CN | 103914855 A | 7/2014 |
| CN | 104361329 A | 2/2015 |
| CN | 103544685 B | 1/2017 |
| CN | 109146906 A | 1/2019 |
| CN | 109166136 A | 1/2019 |
| CN | 110059591 A | 7/2019 |
| CN | 110136153 A | 8/2019 |
| CN | 110378934 A | 10/2019 |
| CN | 110866486 A | 3/2020 |
| EP | 2154880 A2 | 2/2010 |
| JP | 2017200088 A | 11/2017 |
| KR | 20130119741 A | 11/2013 |

OTHER PUBLICATIONS

First Office Action from corresponding Chinese Application No. 201911099501.9, dated Jan. 27, 2022. English translation attached.
The Grant Notice from corresponding Chinese Application No. 201911099501.9, dated Apr. 7, 2022. English translation attached.
Xu et al., "Human Area Refinement for Human Detection," Proceedings of the 18th International Conference on Image Analysis and Processing (2015), p. 130-p. 141.
Huang et al., Intelligent Visual Surveillance A Review,: Chinese Journal of Computers, vol. 38, No. 6, Jun. 2015, Abstract Only in English, 26 pages.
Extended European Search Report for European application 20887070.9 mailed Dec. 12, 2022.

* cited by examiner

SUBJECT DETECTION METHOD AND APPARATUS, ELECTRONIC DEVICE, AND COMPUTER-READABLE STORAGE MEDIUM

CROSS-REFERENCE TO RELATED APPLICATIONS

This application is a continuation of International Application No. PCT/CN2020/122618 filed on Oct. 22, 2020, which claims priority to Chinese patent application No. 201911099501.9, entitled "SUBJECT DETECTION METHOD AND APPARATUS, ELECTRONIC DEVICE, AND COMPUTER-READABLE STORAGE MEDIUM" and filed with CNIPA on Nov. 12, 2019, both of which are incorporated herein by reference in their entireties.

TECHNICAL FIELD

The present disclosure relates to the field of computer technology, and more particularly, to a subject detection method, a subject detection apparatus, an electronic device, and a computer-readable storage medium.

BACKGROUND

With the development of imaging technology, people are more and more accustomed to shooting images or videos by an image capturing device such as a camera on an electronic device, so as to record various kinds of information. After obtaining an image, the electronic device often needs to perform a subject detection on the image to detect a subject, so that a clearer image of the subject can be obtained. However, the traditional subject detection technology has the problem of inaccurate image detection.

SUMMARY

According to various embodiments of the present disclosure, a subject detection method, an electronic device, and a non-transitory computer-readable storage medium are provided.

A subject detection method is disclosed. The subject detection method includes operations as follows. A moving object region is obtained by detecting a moving object on a captured first image. A sliding box is obtained, and a plurality of candidate regions is obtained by sliding the sliding box on the first image. A first region is determined, and the first region is one of the plurality of candidate regions which includes a part of the moving object region with a largest area among the plurality of candidate regions. A proportion of the first region is obtained, and the proportion of the first region is a proportion of the area of the part of the moving object region contained in the first region to an area of the moving object region. A second region is obtained by adjusting a size of the first region based on the proportion of the first region. A proportion of the second region is obtained, and the proportion of the second region is a proportion of an area of a part of the moving object region contained in the second region to the area of the moving object region. The first region is replaced with the second region, the proportion of the first region is replaced with the proportion of the second region, and it is returned to performing the operation of adjusting the size of the first region based on the proportion of the first region until a number of times of the iterative adjustments reaches a threshold, and a region obtained by the last iterative adjustment is determined as a target region.

An electronic device is disclosed. The electronic device includes a memory having a computer program stored thereon, and a processor. The computer program, when executed by the processor, causes the processor to: obtain a moving object region by detecting a moving object on a captured first image; obtain a sliding box, and obtain a plurality of candidate regions by sliding the sliding box on the first image, and determine a first region, the first region being one of the plurality of candidate regions and including a part of the moving object region with a largest area among the plurality of candidate regions; obtain a proportion of the first region, the proportion of the first region being a proportion of the area of the part of the moving object region contained in the first region to an area of the moving object region; obtain a second region by adjusting a size of the first region based on the proportion of the first region; obtain a proportion of the second region, the proportion of the second region being a proportion of an area of a part of the moving object region contained in the second region to the area of the moving object region; and replace the first region with the second region, and replace the proportion of the first region with the proportion of the second region, and return to performing the operation of adjusting the size of the first region based on the proportion of the first region until a number of times of the iterative adjustments reaches a threshold, and determine a region obtained by the last iterative adjustment as a target region.

A non-transitory computer-readable storage medium having a computer program stored thereon is disclosed. The computer program, when executed by a processor, causes the processor to: obtain a moving object region by detecting a moving object on a captured first image; obtain a sliding box, and obtain a plurality of candidate regions by sliding the sliding box on the first image, and determine a first region, the first region being one of the plurality of candidate regions and including a part of the moving object region with a largest area among the plurality of candidate regions; obtain a proportion of the first region, the proportion of the first region being a proportion of the area of the part of the moving object region contained in the first region to an area of the moving object region; obtain a second region by adjusting a size of the first region based on the proportion of the first region; obtain a proportion of the second region, the proportion of the second region being a proportion of an area of a part of the moving object region contained in the second region to the area of the moving object region; and replace the first region with the second region, and replace the proportion of the first region with the proportion of the second region, and return to performing the operation of adjusting the size of the first region based on the proportion of the first region until a number of times of the iterative adjustments reaches a threshold, and determine a region obtained by the last iterative adjustment as a target region.

BRIEF DESCRIPTION OF DRAWINGS

In order to clearly explain technical solutions of embodiments of the present disclosure or in the prior art, drawings used in the embodiments or in the prior art are briefly described below. Obviously, the drawings as described below are merely some embodiments of the present disclosure. Based on these drawings, other drawings can be obtained by those of ordinary skill in the art without any inventive effort.

DESCRIPTION OF EMBODIMENTS

In order to make the purposes, technical solutions and advantages of the present disclosure more clearly, the present disclosure will be described in further detail below with reference to the accompanying drawings and embodiments. It should be understood that the specific embodiments described herein are only used to explain the present disclosure, rather than limit the present disclosure.

It will be understood that the terms such as "first", "second", and the like used in the present disclosure may be used herein to describe various elements, but these elements are not limited by these terms. These terms are only used to distinguish a first element from another element. For example, a first image could be referred to as a second image, and similarly, a second image could be referred to as a first image, without departing from the scope of the present disclosure. Both the first image and the second image are images, but they are not the same image.

Figure 1:
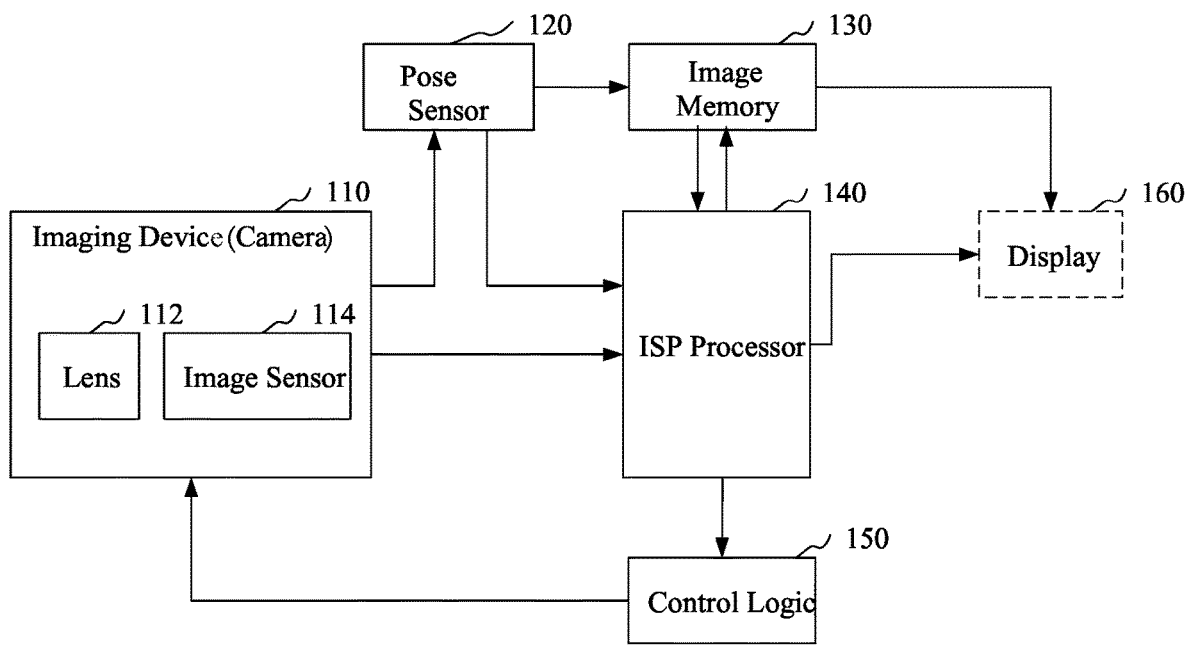
FIG. 1 is a schematic diagram of an image processing circuit according to an embodiment.

Embodiments of the present disclosure provide an electronic device. The electronic device includes an image processing circuit. The image processing circuit may be implemented by hardware and/or software components, and may include various processing units that define an Image Signal Processing (ISP) pipeline. FIG. 1 is a schematic diagram of an image processing circuit according to an embodiment. As illustrated in FIG. 1, for the convenience of description, only various aspects of the image processing technology related to the embodiments of the present disclosure are illustrated.

As illustrated in FIG. 1, the image processing circuit includes an ISP processor 140 and a control logic 150. Image data captured by an imaging device 110 is first processed by the ISP processor 140, which analyzes the image data to capture image statistical information that can be used to determine one or more control parameters of the imaging device 110. The imaging device 110 may include a camera having one or more lenses 112 and an image sensor 114. The image sensor 114 may include an array of color filters (e.g. Bayer filters), and the image sensor 114 may obtain light intensity and wavelength information captured with each imaging pixel of the image sensor 114 and provide a set of raw image data that may be processed by the ISP processor 140. An pose sensor 120 (e.g. a three-axis gyroscope, a Hall sensor, an accelerometer) may provide a captured image processing parameter (e.g. an anti-shake parameter) to the ISP processor 140 based on an interface type of the pose sensor 120. The interface of the pose sensor 120 may utilize a Standard Mobile Imaging Architecture (SMIA) interface, any other serial or parallel camera interface, or a combination of the above interfaces.

Alternatively, the image sensor 114 may transmit the raw image data to the pose sensor 120. The pose sensor 120 may provide the raw image data to the ISP processor 140 based on the interface type of the pose sensor 120, or the pose sensor 120 may store the raw image data to an image memory 130.

The ISP processor 140 may process the raw image data pixel by pixel in various formats. For example, each image pixel may have a bit depth of 8, 10, 12, or 14 bits, and the ISP processor 140 may perform one or more image processing operations on the raw image data and collect statistical information about the image data. The image processing operations can be performed with the same precision or different precisions of bit depth.

The ISP processor 140 may alternatively receive image data from the image memory 130. For example, the interface of the pose sensor 120 transmits the raw image data to the image memory 130, and the raw image data in the image memory 130 is provided to the ISP processor 140 for processing. The image memory 130 may be a part of a memory device, a storage device, or an independent dedicated memory within an electronic device, and may include a Direct Memory Access (DMA) feature.

When receiving the raw image data from an interface of the image sensor 114 or from the interface of the pose sensor 120 or from the image memory 130, the ISP processor 140 may perform one or more image processing operations, such as time domain filtering. The processed image data may be transmitted to the image memory 130 for additional processing before being displayed. The ISP processor 140 receives processed data from the image memory 130 and performs image data processing on the processed data in an original domain and in RGB and YCbCr color spaces. The image data processed by the ISP processor 140 may be output to a display 160 for view by a user and/or for further processing by a Graphics Processing Unit (GPU). Alternatively, the output of the ISP processor 140 may be transmitted to the image memory 130, and the display 160 may read the image data from the image memory 130. In an embodiment, the image memory 130 may be configured to implement one or more frame buffers.

Statistical data determined by the ISP processor 140 may be transmitted to a unit of the control logic 150. For example, the statistical data may include a vibration frequency of a gyroscope, auto exposure, auto white balance, auto focus, flicker detection, black level compensation, shading correction of the lens 112, and other statistical information of the image sensor 114. The control logic 150 may include a processor and/or a microcontroller executing one or more routines (e.g. one or more firmwares) that may determine control parameters of the imaging device 110 and control parameters of the ISP processor 140 based on received statistical data. For example, the control parameters of the imaging device 110 may include control parameters of the pose sensor 120 (e.g. gain, integration time for exposure control, anti-shake parameters, etc.), camera flash control parameters, camera anti-shake displacement parameters, control parameters of the lens 112 (e.g. a focal length for focusing or zooming), or a combination of these parameters. The control parameters of the ISP processor may include gain levels and color correction matrices for automatic white balance and color adjustment (e.g. during RGB processing), and shading correction parameters of the lens 112.

In an embodiment, a first image is obtained by the lens 112 and the image sensor 114 in the imaging device (camera) 110 and transmitted to the ISP processor 140. After receiving the first image, the ISP processor 140 performs operations as follows: obtaining a moving object region by detecting a moving object on the captured first image; obtaining a sliding box, obtaining a plurality of candidate regions by sliding the sliding box on the first image, and determining a first region, the first region being one of the plurality of candidate regions and including a part of the moving object region with a largest area among the plurality of candidate regions; obtaining a proportion of the first region, the proportion of the first region being a proportion of the area of the part of the moving object region contained in the first region to an area of the moving object region; obtaining a second region by adjusting a size of the first region based on the proportion of the first region; obtaining a proportion of the second region, the proportion of the second region being a proportion of an area of a part of the moving object region contained in the second region to the area of the moving object region; replacing the first region with the second region, replacing the proportion of the first region with the proportion of the second region, and returning to performing the operation of adjusting the size of the first region based on the proportion of the first region until a number of times of the iterative adjustments reaches a threshold. Here, the one of the plurality of candidate regions, which contains the part of the moving object region with the largest area is determined as the first region, which can improve the accuracy of the determined first region. The iterative adjustment is then performed on the first region so as to obtain a region with a more suitable size, and the region obtained by the last iterative adjustment is determined as the target region, thereby improving the accuracy of the target region of the subject detection.

In another embodiment, the ISP processor 140 may transmit the target region to the control logic 150. After obtaining the target region, the control logic 150 controls the one or more lenses 112 in the imaging device 110 to move, so as to focus on the photographed object corresponding to the target region and obtain a clearer second image.

Figure 2:
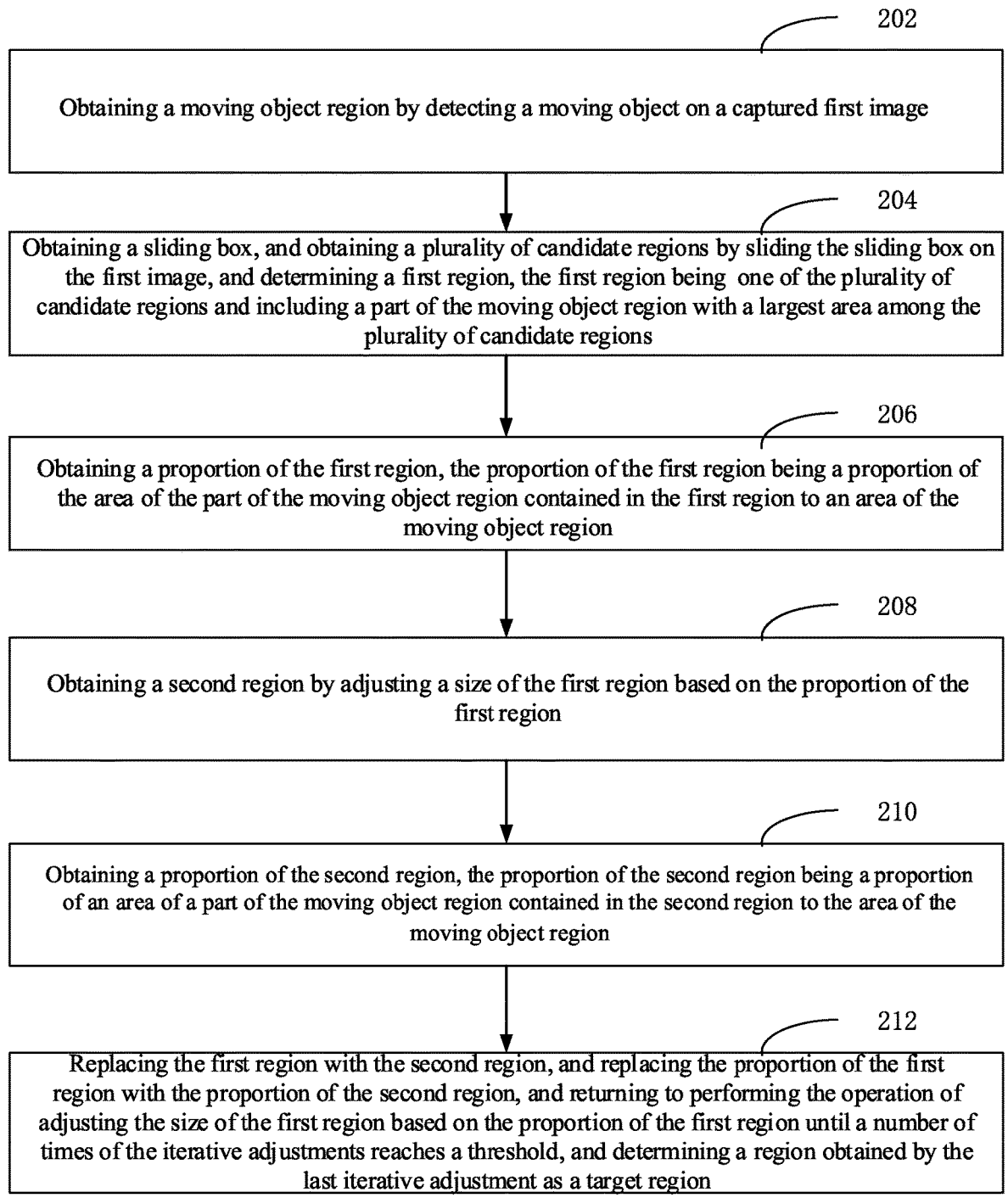
FIG. 2 is a flowchart of a subject detection method according to an embodiment.

FIG. 2 is a flowchart of a subject detection method according to an embodiment. As illustrated in FIG. 2, the subject detection method includes operations 202 to 212.

In operation 202, a moving object region is obtained by detecting a moving object on a captured first image.

The first image may be any one of an RGB (Red, Green, Blue) image, a grayscale image, a depth image, an image corresponding to a Y component in a YUV image, and the like. "Y" in the YUV image represents Luminance or Luma which is a grayscale value, and "U" and "V" represent Chrominance or Chroma which is used to describe a color and saturation degree of the image and specify a color of a pixel.

In the embodiments of the present disclosure, the first image may be obtained by photographing with an electronic device. The electronic device may be provided with one or more cameras, for example, one, two, three, or five cameras, etc. The present disclosure is not limited to any of these examples. The form of the one or more cameras disposed on the electronic device is not limited. For example, the one or more cameras can be built into the electronic device or externally mounted on the electronic device. The one or more cameras each can be a front-facing camera or a rear-facing camera.

Moving object detection (Salient object detection) refers to a method that can detect a moving object in a scenario when facing the scenario. The moving object can be a person, an animal, or any other object that can move. In addition to the moving object, a stationary object can be included in a scenario.

It should be pointed out that after the moving object detection is performed on the captured first image, one or more moving objects may be obtained, and one or more moving object regions may be obtained.

In operation 204, a sliding box is obtained, a plurality of candidate regions are obtained by sliding the sliding box on the first image, and a first region is determined, the first region being one of the plurality of candidate regions and including a part of the moving object region with a largest area among the plurality of candidate regions.

The sliding box is a box for sliding on an image. The sliding box can be one of a square box, a round box, a rectangular box, any other regular box, and any irregular box.

The sliding box is caused to slide on the first image, and one candidate region can be obtained after each sliding. The candidate region is a region contained in the sliding box after the sliding box slides. The candidate region may contain a partial region of the moving object region, or may include an entire region of the moving object region, or may not contain the moving object region.

Specifically, areas of parts of the moving object region contained in the plurality of candidate regions are determined, the areas are compared, and one of the plurality of candidate regions, which contains a part of the moving object region with the largest area, is determined as the first region.

It can be understood that an image is composed of several pixels arranged in a matrix. Therefore, the number of pixels in the part of the moving object region contained in each candidate region can be counted, and an area of the part of the moving object region contained in each candidate region is determined based on a correspondence between the number of pixels and the area.

For example, the number of pixels in a part of the moving object region contained in a candidate region A is 1000, the number of pixels in a part of the moving object region contained in a candidate region B is 800, the number of pixels in a part of the moving object region contained in a candidate region C is 1200, and the correspondence between the number of pixels and the area is $S=0.1x$, where S denotes the area and x denotes the number of pixels. Then the area of the part of the moving object region contained in the candidate region A is 100, the area of the part of the moving object region contained in the candidate region B is 80, and the area of the part of the moving object region contained in the candidate region C is 120. The one of the plurality of candidate regions, which contains a part of the moving object region with the largest area, is the candidate region C, and the candidate region C is determined as the first region.

In operation 206, a proportion of the first region is obtained, the proportion of the first region being a proportion of the area of the part of the moving object region contained in the first region to an area of the moving object region.

Specifically, the area of the moving object region in the first image is determined, and the proportion of the first region can be obtained by dividing the area of the part of the moving object region contained in the first region by the area of the moving object region in the first image.

Likewise, the number of pixels in the moving object region in the first image may be counted, and an area of the moving object region in the first image may be determined based on the correspondence between the number of pixels and the area. For example, the number of pixels in the moving object region in the first image is 2000, and the correspondence between the number of pixels and the area is S=0.1x, where S denotes the area and x denotes the number of pixels, then the area of the moving object region in the first image is 200.

It can be understood that the higher proportion of the first region leads to that the area of the part of the moving object region contained in the first region is larger; the lower proportion of the first region leads to that the area of the part of the moving object region contained in the first region is smaller. When the proportion of the first region is 100%, it means that all of the moving object region is contained in the first region; when the proportion of the first region is 0%, it means that none of the moving object region is contained in the first region; and when the proportion of the first region is between 0% and 100%, it means that a portion of the moving object region is contained in the first region.

In operation 208, a second region is obtained by adjusting a size of the first region based on the proportion of the first region.

After the proportion of the first region is obtained, it can determine whether the proportion of the first region is appropriate. In this way, the size of the first region can be adjusted so as to obtain a second region.

In an embodiment, the size of the first region may be adjusted based on a center of the first region to obtain the second region. For example, the first region is a rectangular region of 400*400, and the size of the first region needs to be adjusted to 200*200. Then a position of a center of the first region can remain unchanged, and each of four sides in the periphery can be reduced by 100. In this way, a second region of 200*200 can be obtained, and the center of the first region overlaps a center of the second region.

In another embodiment, the size of the first region may be adjusted based on a corner point of the first region to obtain the second region. For example, the first region is a rectangular region of 400*400, and the size of the first region needs to be adjusted to 200*200. Then a position of a corner point in the upper left corner of the first region can remain unchanged, a length of an upper side and a length of a lower side each can be reduced by 200, a length of a left side and a length of a right side each can be reduced by 200. In this way, a second region of 200*200 can be obtained, and the corner point in the upper left corner of the first region overlaps with a corner point in an upper left corner of the second region.

In yet another embodiment, the size of the first region may be adjusted based on a feature point of the first region to obtain the second region. For example, the first region is a rectangular region of 400*400, the size of the first region needs to be adjusted to 200*200, and a coordinate position of a feature point of the first region is (500, 600). Then a position of the feature point with the coordinate position (500, 600) of the first region can remain unchanged, a length of an upper side and a length of a lower side each can be reduced by 200, a length of a left side and a length of a right side each can be reduced by 200. In this way, a second region of 200*200 can be obtained.

It should be pointed out that the specific method for adjusting the size of the first region can be set according to the user's needs, and is not limited to any of these examples.

In operation 210, a proportion of the second region is obtained, and the proportion of the second region is a proportion of an area of a part of the moving object region contained in the second region to the area of the moving object region.

Specifically, the area of the moving object region in the first image is determined, and the area of the part of the moving object region contained in the second region is divided by the area of the moving object region in the first image to obtain the proportion of the second region.

Similarly, the number of pixels in the part of the moving object region contained in the second region can be counted, and an area of the part of the moving object region contained in the second region can be determined based on a correspondence between the number of pixels and the area. For example, the number of pixels in the part of the moving object region contained in the second region is 1500, and the correspondence between the number of pixels and the area is S=0.1x, where S denotes the area and x denotes the number of pixels. Then the area of the part of the moving object region contained in the second region is 150.

It can be understood that the higher proportion of the second region leads to that the area of the part of the moving object region contained in the second region is larger; the lower proportion of the second region leads to that the area of the part of the moving object region contained in the second region is smaller. When the proportion of the second region is 100%, it means that all of the moving object region is contained in the second region; when the proportion of the second region is 0%, it means that none of the moving object region is contained in the second region; and when the proportion of the second region is between 0% and 100%, it means that a portion of the moving object region is contained in the second region.

In operation 212, the first region is replaced with the second region, the proportion of the first region is replaced with the proportion of the second region, and it is returned to performing the operation of adjusting the size of the first region based on the proportion of the first region until a number of times of the iterative adjustments reaches a threshold, and a region obtained by the last iterative adjustment is determined as a target region.

Specifically, the first region is replaced with the second region, the proportion of the first region is replaced with the proportion of the second region, and it is returned to performing the operation of adjusting the size of the first region based on the proportion of the first region. That is, the size of the second region is adjusted based on the proportion of the second region to obtain a next region and a proportion of the next region, and then a size of the next region is adjusted based on the proportion of the next region. The cycle is repeated until the number of times of the iterative adjustments reaches the threshold. In this way, a region with a suitable size can be obtained. The region obtained by the last iteration adjustment is determined as the target region.

In an embodiment, the size of the first region can be adjusted by using a dichotomy method. For example, when a width and a height of the first region both are h/3, the first region is reduced by using the dichotomy method, that is (0+h/3)/2=h/6, a width and a height of the second region both are h/6.

In another embodiment, the size of the first region may be adjusted by using a functional relation. For example, when the proportion of the first region is too large and the size of the first region needs to be reduced, the first region may be adjusted based on a functional relation of y=0.8x. Here, x denotes a length of a side of the first region, and y denotes a length of a side of the second region.

In other embodiments, the size of the first region may be adjusted in other manners, and the present disclosure is not limited to any of these examples.

In the above-mentioned subject detection method, a moving object region is obtained by detecting a moving object on a captured first image. A sliding box is obtained, and is caused to slide on the first image to obtain a plurality of candidate regions. One of the plurality of candidate regions, which contains a part of the moving object region with a largest area, is determined as a first region. A proportion of the first region is obtained, and the proportion of the first region is a proportion of the area of the part of the moving object region contained in the first region to an area of the moving object region. A second region is obtained by adjusting a size of the first region based on the proportion of the first region. A proportion of the second region is obtained, and the proportion of the second region is a proportion of an area of a part of the moving object region contained in the second region to the area of the moving object region. The first region is replaced with the second region. The proportion of the first region is replaced with the proportion of the second region. It is returned to performing the operation of adjusting the size of the first region based on the proportion of the first region until a number of times of the iterative adjustments reaches a threshold. The one of the plurality of candidate regions, which contains the part of the moving object region with the largest area is determined as the first region, which can improve the accuracy of the determined first region. Then the iterative adjustment is performed on the first region to obtain a region with a more suitable size. The region obtained by the last iterative adjustment is determined as the target region, thereby improving the accuracy of the target region of the subject detection.

In an embodiment, the above method may further include obtaining a second image by performing a focusing operation based on the target region.

Focusing refers to a process of moving a lens to cause the focus of the lens to be on an object being photographed. A clearer image of the object being photographed can be obtained by focusing. In the embodiments of the present disclosure, in order to obtain a clearer image of the moving object region, subject detection is performed on the captured first image to obtain the target region, and focusing is performed based on the target region, so that the moving object in the obtained second image is clearer.

In an embodiment, the obtaining the second region by adjusting the size of the first region based on the proportion of the first region includes: obtaining the second region by reducing the size of the first region in response to the proportion of the first region being greater than a proportion threshold; and obtaining the second region by enlarging the size of the first region in response to the proportion of the first region being smaller than or equal to the proportion threshold.

When the proportion of the first region is greater than the proportion threshold, it indicates that the proportion of the first region is too large, that is, the part of the moving object region contained in the first region is too large, therefore the size of the first region is reduced. When the proportion of the first region is smaller than or equal to the proportion threshold, it indicates that the proportion of the first region is too small, that is, the part of the moving object region contained in the first region is too small, therefore the size of the first region is enlarged.

It can be understood that the first image may include many noise points. When the proportion of the first region is greater than the proportion threshold, it means that a relatively large part of the moving object region is contained in the first region and relatively many noise points are contained in the first region. However, when relatively many noise points are contained in the first region, a focusing error is likely to occur. Therefore, when the proportion of the first region is greater than the proportion threshold, reducing the size of the first region can prevent the first region from containing relatively many noise points and enhance the noise immunity.

For example, assuming that a width and a height of the first region are (w/3, h/3), and the first region is reduced by using the dichotomy method, the width and the height of the first region are reduced to (w/3/2, h/3/2)=(w/6, h/6) to obtain the second region. When the size of the second region still needs to be reduced based on the proportion of the second region, the width and the height (w/6, h/6) of the second region are reduced to (w/12, h/12) by using the dichotomy method.

When the proportion of the first region is smaller than or equal to the proportion threshold, that is, a relatively small part of the moving object region is contained in the first region, it is difficult to focus on the moving object region of the first image when focusing, and it is likely to focus on a background region or any other region. Therefore, when the proportion of the first region is smaller than or equal to the proportion threshold, the size of the first region is enlarged, and the obtained second region can contain a larger part of the moving object region, thereby improving the accuracy of the subject detection.

For example, assuming that a width and a height of the first region are (w/3, h/3), and the first region is enlarged by using the dichotomy method, then the width and height of the first region are enlarged to ((w/3+w)/2, (h/3+h)/2)=(2*w/3, 2*h/3) to obtain the second region. When the size of the second region still needs to be enlarged based on the proportion of the second region, the width and the height of the second region are enlarged to ((2*w/3+w)/2, (2*h/3+h)/2)=(5*w/6, 5*h/6) by using the dichotomy method.

In an embodiment, the obtaining the plurality of candidate regions by sliding the sliding box on the first image includes: determining a sliding step size for the sliding box; obtaining the plurality of candidate regions by sliding the sliding box on the first image based on the sliding step size.

The sliding step size refers to a distance at which the sliding box slides each time. For example, the sliding step size is 10 pixels, that is, a candidate region is obtained after the sliding box slides by 10 pixels. The smaller sliding step size leads to that the distance at which the sliding box slides each time is shorter, the more candidate regions are obtained, and the determined first region is more accurate. The larger sliding step size leads to that the distance at which the sliding box slides each time is longer and the less candidate regions are obtained, thereby saving the calculation amount of the computer.

In an embodiment, the sliding step size may have a sliding direction. For example, the sliding direction may be a horizontal leftward sliding direction, a horizontal rightward sliding direction, a vertical upward sliding direction, a vertical downward sliding direction, etc. The sliding direction of the sliding box is obtained, and then the sliding box is caused to slide on the first image along the sliding direction based on the sliding step size to obtain the plurality of candidate regions.

For example, the sliding step size is 5 pixels, and the sliding direction is a horizontal rightward sliding direction. That is, after the sliding box is caused to slide horizontally to the right by 5 pixels, a candidate region is obtained.

It can be understood that, when the sliding box slides on the first image based at the sliding step size, the sliding box is switched to slide on a next row of pixels after completing sliding on a row of pixels. Similarly, when the sliding box slides in the vertical direction, the sliding box is switched to slide on a next column of pixels after completing sliding on a column of pixels.

In the above subject detection method, the sliding step size of the sliding box is determined, which can balance computer resources and the accuracy of the determined first region. The sliding box is caused to slide on the first image based on the sliding step size to obtain the plurality of candidate regions, so that a more suitable first region is determined from the plurality of candidate regions.

In an embodiment, the obtaining the plurality of candidate regions by sliding the sliding box on the first image based on the sliding step size includes: obtaining a binary image by mapping the moving object region to the first image; obtaining the plurality of candidate regions by sliding the sliding box on the binary image based on the sliding step size.

A binary image refers to an image in which a pixel value of each pixel in the image is represented by one of two values. Here, the two values can be set according to a user's needs. For example, the two values can be 0 and 255, 0 and 1, or any other values.

In the binary image, one of the two values is used to represent each pixel value contained in the moving object region, and the other value is used to represent each pixel value in any other region. For example, a pixel value of each pixel in the moving object region in the binary image is represented by 255, and a pixel value of each pixel in any other region is represented by 0.

It can be understood that the pixel value of 255 is represented as white, and the pixel value of 0 is represented as black, then the binary image is a black-and-white image, the moving object region is a white region, and any other region is a black region.

In an embodiment, each pixel value in the moving object region in the binary image is a first value, and the operation of determining the first region includes: determining a first sum of first values in each candidate region; and determining the candidate region with a largest first sum as the first region.

Specifically, the number of pixels in the part of the moving object region contained in each candidate region may be counted, and the number may be multiplied by the first value to obtain a first sum for each candidate region. When a first sum is relatively larger, it indicates that the number of pixels in the part of the moving object region contained in a candidate region corresponding to the first sum is relatively larger, that is, the area of the part of the moving object region contained in the candidate region corresponding to the first sum is relatively larger. Therefore, the candidate region with the largest first sum, that is, the candidate region which contains the part of the moving object with the largest area, can be determined as the first region.

For example, the first value is 1. If the number of pixels in the part of the moving object region contained in a candidate region A is 500, the first sum of the candidate region A is 500; if the number of pixels in the part of the moving object region contained in a candidate region B is 352, the first sum of the candidate region B is 352; and if the number of pixels in the part of the moving object region contained in a candidate region C is 423, then the first sum of the candidate region C is 423. Therefore, the first sum of the candidate region A is the largest, i.e., the number of pixels contained in the candidate region A is the largest, that is, the area of the part of the moving object region contained in candidate region A is the largest. The candidate region A is therefore determined as the first region.

In an embodiment, the operation of obtaining the proportion of the first region includes: determining a second sum of first values in the moving object region in the first image; and determining the proportion of the first region by dividing the first sum of the first region by the second sum.

Specifically, the number of pixels contained in the moving object region in the first image may be counted, and the number may be multiplied by the first value to obtain the second sum for the moving object region in the first image.

The proportion of the first region is the proportion of the area of the part of the moving object region contained in the first region to the area of the moving object region. The area of the part of the moving object region contained in the first region can be represented by the first sum for the first region, and the area of the moving object region can be represented by the second sum of first values in the moving object region. Therefore, the proportion of the first region can be determined by dividing the first sum for the first region by the second sum.

In an embodiment, the above method further includes: determining a corresponding integral map based on the binary image. The operation of obtaining the plurality of candidate regions by sliding the sliding box on the binary image based on the sliding step size includes: obtaining the plurality of candidate regions by sliding the sliding box on the integral map based on the sliding step size.

Figure 3:
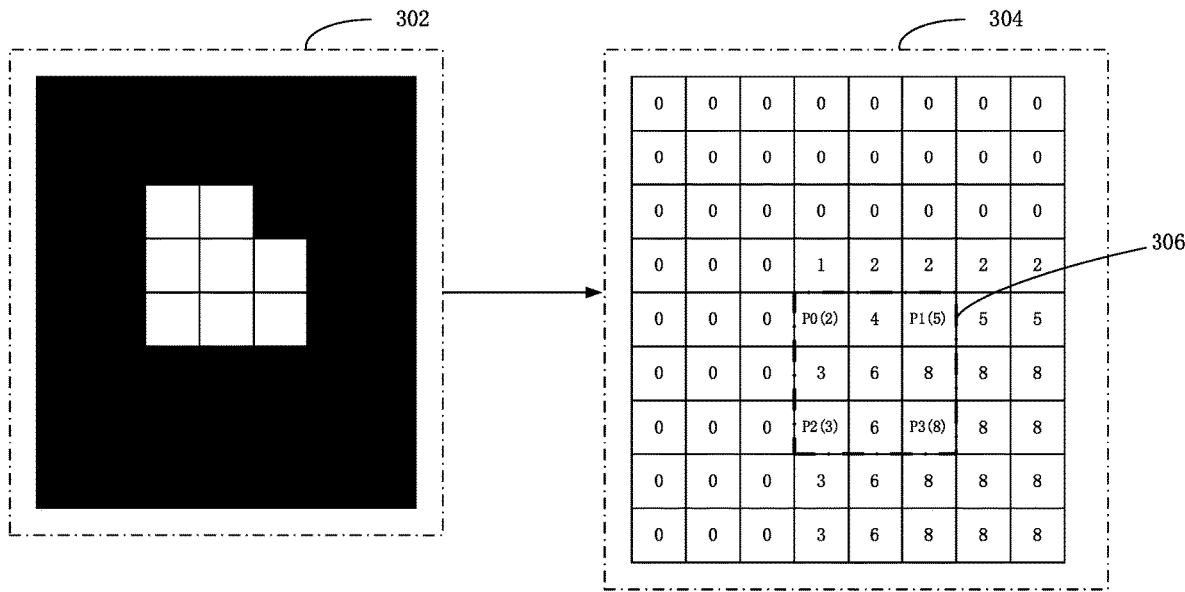
FIG. 3 is a schematic diagram of determining a corresponding integral map based on a binary image according to an embodiment.

An integral map refers to an image of integrals corresponding to pixels in the binary image. As illustrated in FIG. 3, 302 represents a binary image, and the resolution of the binary image is 8*7, that is, each binary image contains 8 rows and 7 columns of pixels. The first value in the binary image is 1, that is the pixel value of the pixel in the white region of the binary image is 1. The other value in the binary image, that is, the second value is 0, and the pixel value of the pixel in the black region of the binary image is 0.

Taking the corner point in the upper left corner of the binary image as the origin, the upper side of the binary image as the positive axis of the x-axis, and the left side of the binary image as the positive axis of the y-axis, respective pixels of the binary image are selected one by one, pixel values of all the pixels in the upper left region of a selected one of the respective pixels are added up, and a sum of the pixels values is used as the integral of the selected one of the respective pixels. The integrals corresponding to the respective pixels are counted to generate an integral map 304. For example, the integral of the pixel P0 in the integral map 304 is 2, which indicates that the upper left region of the pixel P0 contains two pixels with the first value; and the integral of the pixel P2 in the integral graph 304 is 3, which indicates that the upper left region of the pixel P2 contains 3 pixels with the first value.

It should be pointed out that, in this embodiment, the resolution of the binary image 302 is 8*7, and the value of each pixel in the integral map 304 is the sum of all pixel values of the upper left region of the pixel in the corresponding binary image. Therefore, in order to completely represent the integral corresponding to each pixel in the binary image, the size of the integral map is 9*8, and the integral map 304 can completely represent the integral of each pixel in the binary image. For example, the value corresponding to the ninth row and eighth column in the integral map 304 is the sum of all pixel values of the entire binary image, that is, 8.

The sliding box is caused to slide on the integral map based on the sliding step size to obtain the plurality of candidate regions. Therefore, areas of the plurality of candidate regions can be calculated more quickly by using the values of the respective pixels in the integral map.

For example, the size of the sliding box is 3*3, and the sliding box is caused to slide on the integral graph 304. When a candidate region 306 is obtained after the sliding box slides, pixels in the four corners of the candidate region 306 are respectively P0, P1, P2 and P3. The value of the pixel P0 is 2, indicating that the upper left region of the pixel P0 contains 2 pixels with the first value; the value of the pixel P1 is 5, indicating that the upper left region of the pixel P1 contains 5 pixels with the first value; the value of the pixel P2 is 3, indicating that the upper left region of the pixel P2 contains 3 pixels with the first value; and the value of the pixel P3 is 8, indicating that the upper left region of the pixel P3 contains 8 pixels with the first value. Therefore, the number of pixels contained in the candidate region 306 is P3−P2−P1+P0=8−3−5+2=2. Then, an area of the candidate region 306 can be obtained based on the correspondence between the number of pixels and the area, so as to more quickly determine the areas of the plurality of candidate regions.

Figure 4:
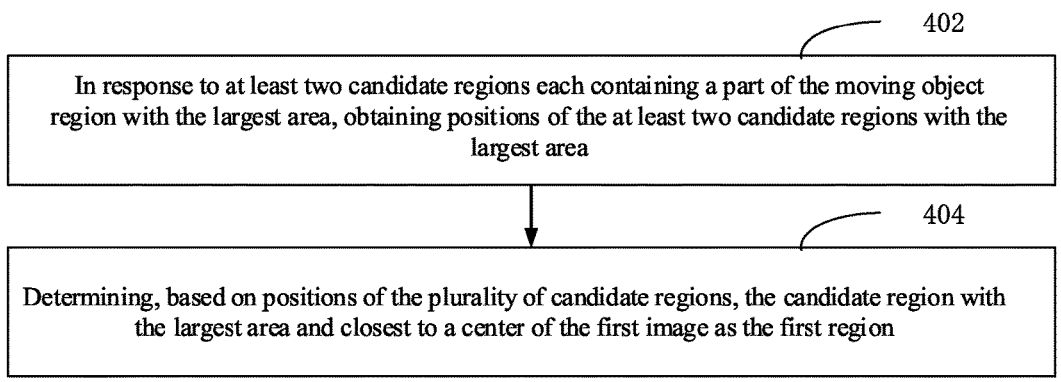
FIG. 4 is a flowchart of determining a first region according to an embodiment.

In an embodiment, as illustrated in FIG. 4, the determining the first region includes the following operations.

In operation 402, in response to at least two candidate regions each containing a part of the moving object region with the largest area, positions of the at least two candidate regions with the largest area are obtained.

At least two candidate regions each containing a part of the moving object region with the largest area means that the areas of the parts of the moving object region contained in the at least two candidate regions respectively are the largest and the same. For example, a candidate region A and a candidate region B both contain the entire moving object region.

When at least two candidate regions each contain a part of the moving object region with the largest area, the positions of the at least two candidate regions with the largest area are obtained.

In an embodiment, a position coordinate of a center of a candidate region may be determined, and the position coordinate of the center is used to represent the position of the candidate region. In another embodiment, a position coordinate of an edge point of a candidate region may be determined, for example, a point in the upper left corner of the candidate region, and the position coordinate of the edge point is used to represent the position of the candidate region. In other embodiments, a position coordinate of a feature point of a candidate region can be determined, such as an eye, tip of the nose, a corner of the mouth of a person, etc., and the position coordinate of the feature point is used to represent the position of the candidate region. The specific manner of representing the position of the candidate region is not limited to any of the above examples.

In operation 404, based on positions of the plurality of candidate regions, the candidate region with the largest area and closest to a center of the first image is determined as the first region.

It can be understood that when an image is captured, an object photographed is often located in a central region of the image. Therefore, the first region can be determined more accurately by determining the candidate region with the largest area and closest to the center of the first image as the first region.

Figure 5:
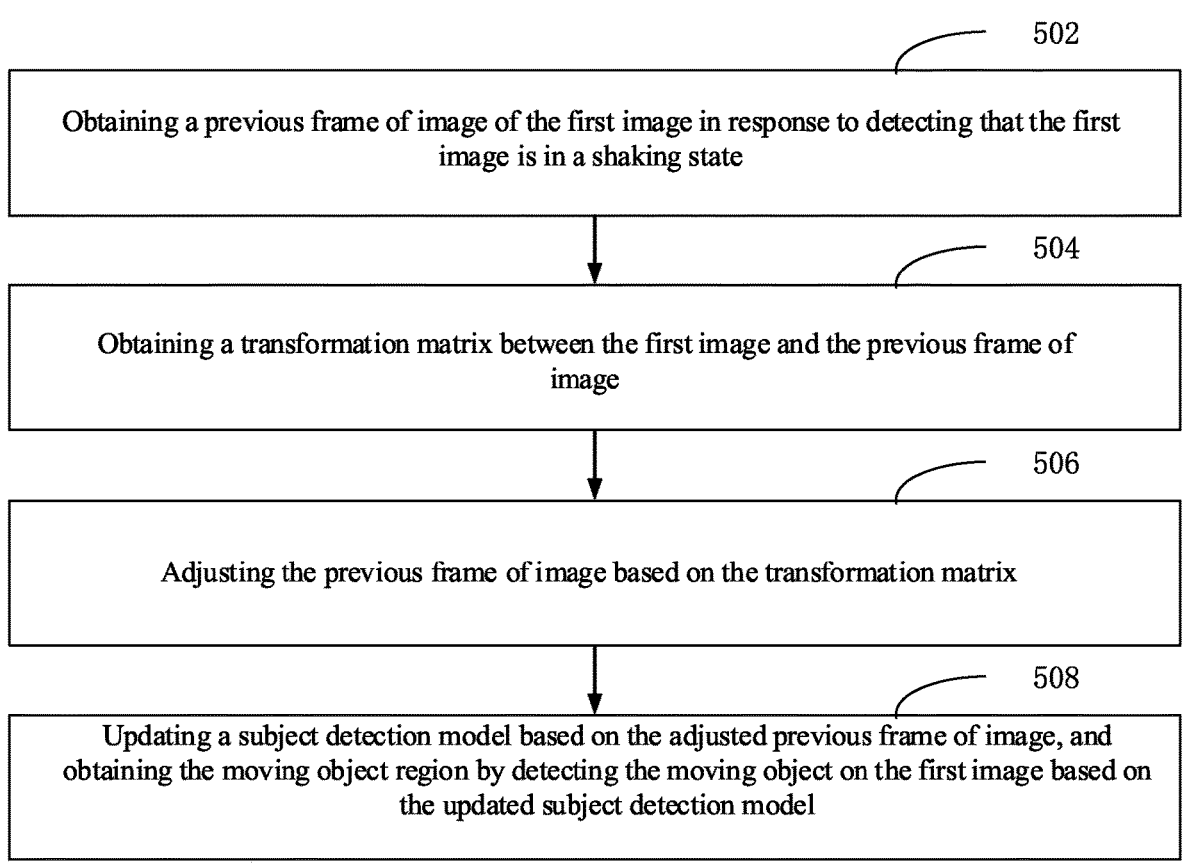
FIG. 5 is a flowchart of detecting a moving object according to an embodiment.

In an embodiment, as illustrated in FIG. 5, the obtaining the moving object region by detecting the moving object on the captured first image includes the following operations.

In operation 502, in response to detecting that the first image is in a shaking state, a previous frame of image of the first image is obtained.

When the first image is in an shaking state, the first image is relatively blurred; and when the first image is not in a shaking state, that is, when the first image is in a still state, the first image is relatively clear.

In an embodiment, when a camera of an electronic device is in a moving state, the first image captured by the camera is relatively blurred, that is, the first image is in a shaking state. In another embodiment, when the object captured by the camera is in a moving state, the first image captured by the camera is also relatively blurred, that is, the first image is in a shaking state.

Specifically, the electronic device may store respective captured images in a first-in, first-out queue based on a sequence of shooting time of the camera, and obtain the first image and the previous frame of image of the first image from the first-in, first-out queue.

The first-in, first-out queue means that the image stored first is taken out first. The electronic device first obtains the previous frame of image of the first image from the first-in, first-out queue, and then obtains the first image from the first-in, first-out queue.

In another embodiment, current shooting time and previous shooting time are obtained. The first image is obtained based on the current shooting time, and the previous frame of image of the first image is obtained based on the previous shooting time.

The electronic device can obtain the current shooting time and a shooting frequency, and then can obtain the previous shooting time based on the current shooting time and the shooting frequency. For example, if the current shooting time is 15:45:56.200, and the shooting frequency is 10 frames/s, that is, one frame of image is shot every 100 ms, the previous shooting time is 15:45:56.100. The first image is obtained based on the current shooting time, and the previous frame of image is obtained based on the previous shooting time.

In an embodiment, the first image and the previous frame of image may be down-sampled to obtain the first image with a smaller size and the previous frame of image with a smaller size, thereby saving the computation amount of the computer processing.

In an embodiment, the first image and the previous frame of image may be subject to a filtering processing. In this way, a high-frequency noise carried by a complex background containing a large amount of texture details in the first image and the previous frame of image may be filtered out, or a high-frequency noise caused by an image down-sampling may be filtered out. Therefore, the obtained first image and previous frame of image can be more accurate, thereby preventing a false subject detection. The filtering processing may be at least one of Gaussian filtering processing, smoothing filtering processing, bilateral filtering processing, and the like. The down-sampling refers to sampling at intervals of several pixels in the image to obtain a new image.

In operation 504, a transformation matrix between the first image and the previous frame of image is obtained.

The transformation matrix represents a matrix by means of which a pixel of the previous frame of image is transformed to a pixel of the first image. For example, a position of a feature point in the previous frame of image is (200, 50), a position of a feature point in the first image, which corresponds to the feature point in the previous frame of image, is (200, 100). Therefore, the transformation matrix can represent that the feature point in the previous frame of image at the position (200,50) is transformed to the feature point in the first image at the position (200,100).

In operation 506, the previous frame of image is adjusted based on the transformation matrix.

Specifically, a first position coordinate of each pixel in the previous frame of image is obtained, and the first position coordinate of each pixel in the previous frame of image is multiplied by the transformation matrix to obtain a second position coordinate corresponding to each pixel. An adjusted previous frame of image may be generated based on the second position coordinate of each pixel.

The first position coordinate refers to a position coordinate of each pixel in the previous frame of image before correction. The second position coordinate refers to a position coordinate of each pixel in the previous frame of image after correction. For example, a position coordinate (200,50) represents a position with a abscissa value of 200 and a ordinate value of 50.

In an embodiment, some noise points may exist in an adjusted previous frame of image, and the adjusted previous frame of image may be subject to a filtering processing to remove the noise points, so as to obtain the previous frame of image with a higher accuracy. The filtering processing may be at least one of Gaussian filtering processing, smoothing filtering processing, bilateral filtering processing, and the like.

In operation 508, a subject detection model is updated based on the adjusted previous frame of image, and the moving object region is obtained by detecting the moving object on the first image based on the updated subject detection model.

The subject detection model refers to a model used to detect a moving object on the first image to obtain a moving object region. In the subject detection model, various subject detection parameters are included, for example, a mean value of pixel values of respective pixels in a background region, a variance of pixel values of the respective pixels in the background region, a color mean value of the moving object region, a color variance of the moving object region, etc.

Specifically, pixel values of respective pixels in the adjusted previous frame of image are obtained, target parameters in the subject detection model are determined based on the pixel values of the respective pixels in the adjusted previous frame of image, and various parameters in the subject detection model are updated based on the target parameters.

The target parameters may include, but not limited to, a mean value of pixel values of respective pixels in the background region of the previous frame of image, a variance of pixel values of respective pixels in the background region of the previous frame of image, a color mean value of the moving object region in the previous frame of image, a color variance of the moving object region in the previous frame of image.

It can be understood that, with the traditional subject detection method, when the camera moves or the object being photographed moves, it is very difficult to detect an moving object in the image or the detected moving object is inaccurate.

In the embodiments of the present disclosure, when detecting that the first image is in a shaking state, a previous frame of image of the first image is obtained. A transformation matrix between the first image and the previous frame of image is obtained. The previous frame of image is adjusted based on the transformation matrix, and the adjusted previous frame of image is closer to the first image. A subject detection model is updated based on the adjusted previous frame of image, and the updated subject detection model can more accurately detect the moving object on the first image so as to obtain a more accurate moving object region, thereby improving the accuracy of the subject detection.

In an embodiment, the operation of obtaining the transformation matrix between the first image and the previous frame of image includes: obtaining a target point pair from the first image and the previous frame of image; and obtaining the transformation matrix between the first image and the previous frame of image based on the target point pair.

The target point pair refers to a pair of points composed of a point in the first image and a corresponding point in the previous frame of image. The two points contained in the target point pair can be pixels respectively, or can be regions containing several pixels respectively (each of the regions is used as a feature point), or can be two points which are randomly obtained from the first image and the previous frame of image respectively. The two points contained in the target point pair are not limited to any of these examples. For example, the pixel in the 5th row and the 29th column of the first image and the pixel in the 5th row and the 29th column of the previous frame of image can compose a target point pair. A feature point at the nose tip in the first image and a feature point at the nose tip in the previous frame of image can compose a target point pair.

One or more target point pairs may be provided, and the number thereof is not limited herein. It can be understood that the greater number of target point pairs leads to that the transformation matrix obtained based on the target point pairs is more accurate.

Specifically, positions of two points contained in each target point pair are obtained, and the transformation matrix between the first image and the previous frame of image is obtained based on the positions of the two points contained in each target point pair.

A variable in the transformation matrix can be preset. When four variables in the transformation matrix are set, four equations are required, that is, four target point pairs are required. The product obtained after multiplication of a position of a point that is located in the previous frame of image and contained in each target point pair by the preset transformation matrix is equal to a position of a corresponding point in the first image. In this way, four equations are obtained. The four preset variables in the transformation matrix can be solved so as to obtain the transformation matrix.

In the above subject detection method, the target point pair is obtained from the first image and the previous frame of image, and a more accurate transformation matrix between the first image and the previous frame of image can be obtained based on the target point pair.

In an embodiment, the target point pair includes at least one of a tracking point pair and a matching point pair.

The target point pair may include only the tracking point pair, or only the matching point pair, or both the tracking point pair and the matching point pair.

In an embodiment, the generation method of the tracking point pair includes the following operations.

In operation a1, the first image and the previous frame of image are divided in a same way to obtain all sub-regions of the first image and all sub-regions of the previous frame of image.

Division in the same way means that the first image and the previous frame of image are divided into a same number of sub-regions using a same division method. That is, all the sub-regions obtained from the first image correspond to all the sub-regions of the previous frame of image in one-to-one correspondence. For example, the first image is divided into nine grids, and the previous frame of image is divided into the same nine grids.

The number of sub-regions to be obtained by division is obtained, and the first image and the previous frame of image are divided in the same way based on the number of the sub-regions to be obtained by division, so as to obtain all the sub-regions of the first image and all the sub-regions of the previous frame of image. It can be understood that the greater number of divided sub-regions leads to that the images are divided in a finer way, and the obtained tracking point pair is more accurate.

In operation a2, a target number of random point(s) is/are extracted from each of all the sub-regions of the first image and each of all the sub-regions of the previous frame of image respectively.

Random extraction from each of all the sub-regions can be performed. The target number of random point(s) extracted from each sub-region can be equal to or greater than 1.

Specifically, Ten random points are randomly extracted from a first sub-region of the first image, and Ten random points are randomly extracted from a first sub-region of the previous frame of image. Five random points are randomly extracted from a third sub-region of the first image, and five random points are randomly extracted from a third sub-region of the previous frame of image.

In operation a3, the tracking point pair is generated based on the random point in each of all the sub-regions of the first image and the random point in a corresponding one of all the sub-regions in the previous frame of image.

When one random point is extracted from a sub-region of the first image, one random point is extracted from a corresponding sub-region of the previous frame of image, and the two extracted random points compose a tracking point pair. When N random points are extracted from a sub-region of the first image, at least two random points are extracted from a corresponding sub-region of the previous frame of image, the first random point randomly extracted from the sub-region of the first image and the first random point randomly extracted from the corresponding sub-region of the previous frame of image can compose a tracking point pair, and the n-th random point randomly extracted from the sub-region of the first image and the n-th random point randomly extracted from the corresponding sub-region of the previous frame of image can compose a tracking point pair.

In the above-mentioned subject detection method, the tracking point pair can be generated by extraction of random points, therefore improving the randomness of the target point pair, and avoiding a shortage of the number of the target point pairs in a weak texture region, which would otherwise cause the problem of low accuracy of the transformation matrix obtained subsequently. In this way, the extracted target point pair has a better global distribution, which can improve the accuracy of the transformation matrix, thereby improving the accuracy of the subject detection.

In an embodiment, the generation method of the matching point pair includes the following operations.

In operation b1, a feature point is extracted from the first image, and a corresponding feature point is extracted from the previous frame of image.

The feature point refers to a point where a gray value of the image changes drastically or a point on an edge of the image where the curvature is larger (i.e., an intersection point of two edges). For example, the feature point may be an eye, the nose tip, a corner of the mouth, a mole, a center of an object, etc. The feature point is not limited to any of these examples.

Specifically, a gray value of each pixel in the first image is detected. When a difference between the gray values of adjacent pixels is greater than a threshold, a region where the adjacent pixels are located may be determined as a feature point.

In an embodiment, based on a feature point in the first image, a corresponding feature point can be extracted from the previous frame of image. In another embodiment, a gray value of each pixel in the previous frame of image can be detected. When a difference between the gray values of adjacent pixels is greater than a threshold, a region where the adjacent pixels are located can be determined as a feature point, and a correspondence is established between the feature point in the previous frame of image and the feature point in the first image.

In an embodiment, a target region may be obtained. A feature point may be extracted from the target region of the first image, and a corresponding feature point may be extracted from the target region of the previous frame of image.

It can be understood that the target region may be a central region of an image. Generally, a subject in an image or an object photographed by a user is in the center region of the image. Extracting the feature point from the central region of the first image and extracting the feature point from the central region of the previous frame of image can not only save the calculation amount of an electronic device, but also improve the accuracy of the extracted feature points.

In operation b2, a matching point pair is generated based on the feature point extracted from the first image and the feature point extracted from the previous frame of image.

Specifically, the feature point extracted from the first image and the corresponding feature point of the previous frame of image compose the matching point pair. Generally, the greater number of the matching point pairs leads to that the transformation matrix obtained subsequently obtained based on the matching point pairs is more accurate.

In the above-mentioned subject detection method, a feature point is extracted from the first image, and a corresponding feature point is extracted from the previous frame of image. A matching point pair is generated based on the feature point extracted from the first image and the feature point extracted from the previous frame of image. The extracted feature points can more accurately represent a feature of the first image and a feature of the previous frame of image, which can improve the accuracy of the transformation matrix, thereby improving the accuracy of the subject detection.

Figure 6:
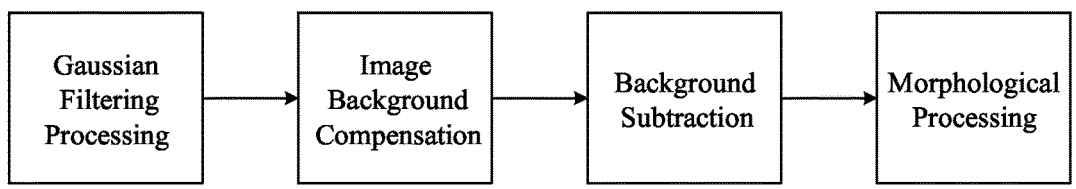
FIG. 6 is a flowchart of detecting a moving object according to another embodiment.
Figure 7:
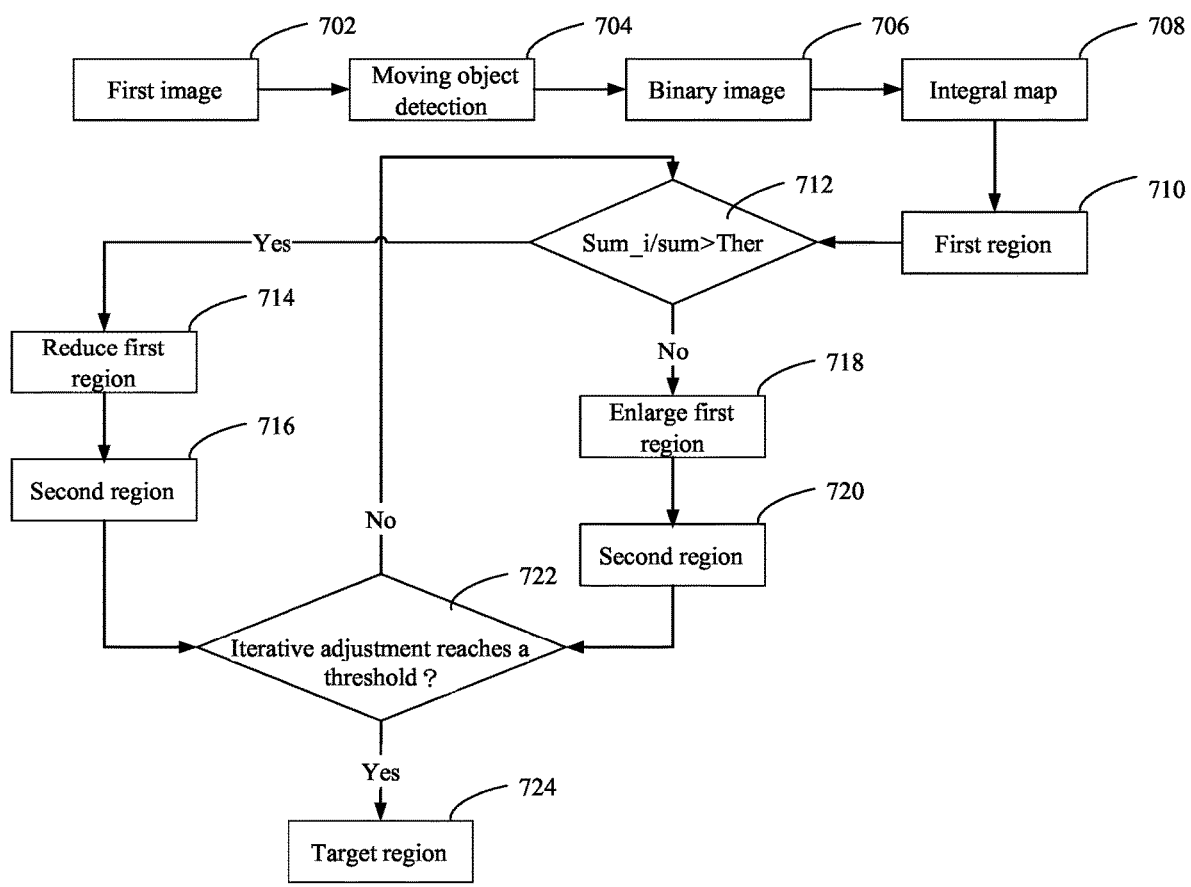
FIG. 7 is a flowchart of a subject detection method according to another embodiment.

In an embodiment, as illustrated in FIG. 6, Gaussian filtering processing is performed on the first image to eliminate a high-frequency noise caused by a complex background containing a large amount of texture details and a high-frequency noise caused by an image down-sampling, thereby preventing a subsequent false subject detection. Image background compensation is performed on the first image processed by the Gaussian filtering. The image background compensation refers to using a target point pair of the first image and the previous frame of image to obtain a transformation matrix, and adjusting the previous frame of image based on the transformation matrix. A subject detection model is updated based on the adjusted previous frame of image, and the moving object detection is performed on the first image based on the updated subject detection model to obtain the background region, and the background region and the first image are subjected to differential processing, that is, background subtraction, so as to obtain the moving object region.

Further, morphological processing can be performed on the moving object region, that is, corrosion is performed first, and then expansion is performed, which can remove noises and reduce some voids in the moving object region, thereby improving the accuracy of the moving object region.

In an embodiment, a first image 702 is obtained, and moving object detection is performed on the first image, that is, operation 704 is performed to obtain the moving object region. The moving object region is mapped to the first image 702 to obtain a binary image 706. Based on the binary image 706, a corresponding integral map 708 is determined. A sliding box and a sliding step size are obtained, the sliding box is caused to slide on the integral map 708 based on the sliding step size to obtain a plurality of candidate regions, and one of the plurality of candidate regions, which contains a part of the moving object region with a largest area, is determined as a first region 710.

An area sum_i of the part of the moving object region contained in the first region is determined based on values of respective pixels on the integral map. An area sum of the moving object region in the first image is calculated. A proportion of the first region, that is, sum_i/sum, is obtained. Operation 712 is performed to determine whether the proportion of the first region is greater than a proportion threshold Ther.

When the proportion of the first region is greater than the proportion threshold Ther, operation 714 is performed to reduce a size of the first region to obtain a second region 716. When the proportion of the first region is smaller than or equal to the proportion threshold Ther, operation 718 is performed to enlarge the size of the first region to obtain a second region 720. Operation 722 is performed to determine whether the number of times of the iterative adjustment reaches a threshold. When the number of times of the iterative adjustment does not reach the threshold, the first region is replaced with the obtained second region, a proportion of the second region is obtained, the proportion of the first region is replaced with the proportion of the second region, and it is returned to performing the operation 712. When the number of times of the iterative adjustment reaches the threshold, operation 724 is performed, and a region obtained by the last iterative adjustment is determined as a target region.

It should be understood that although respective operations in the flowcharts of FIG. 2, FIG. 4 and FIG. 5 are shown in sequence according to the arrows, these operations are not necessarily performed sequentially in the order indicated by the arrows. Unless otherwise specified herein, there is no strict restriction on the performing order of these operations, and these operations may be performed in any other order. Moreover, at least some of the operations in FIG. 2, FIG. 4 and FIG. 5 may include a plurality of sub-operations or a plurality of stages, and these sub-operations or stages are not necessarily performed and completed at the same time, but may be performed at different time. The sub-operations or stages are not necessarily performed in order, but may be performed alternately with other operations or at least some of sub-operations or stages of the other operations.

Figure 8:
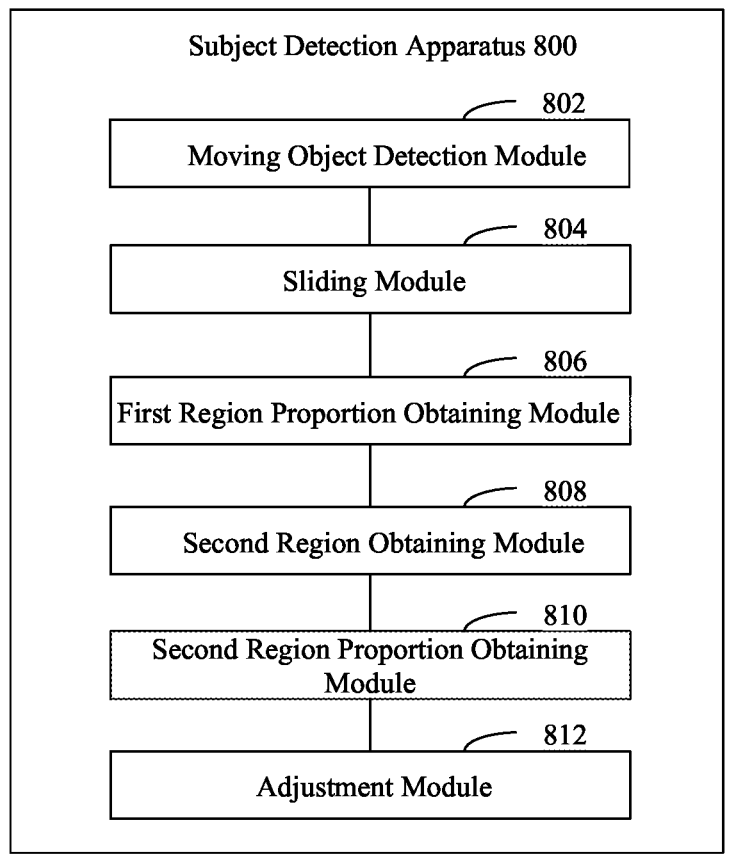
FIG. 8 is a block diagram showing a structure of a subject detection apparatus according to an embodiment.

FIG. 8 is a block diagram of a structure of a subject detection apparatus according to an embodiment. As illustrated in FIG. 8, the subject detection apparatus 800 is provided and includes: a moving object detection module 802, a sliding module 804, a first region proportion obtaining module 806, a second region obtaining module 808, and a second region proportion obtaining module 810, and an adjustment module 812.

The moving object detection module 802 is configured to obtain a moving object region by detecting a moving object on a captured first image.

The sliding module 804 is configured to obtain a sliding box, obtain a plurality of candidate regions by sliding the sliding box on the first image, and determine a first region, the first region being one of the plurality of candidate regions and including a part of the moving object region with a largest area among the plurality of candidate regions.

The first region proportion obtaining module 806 is configured to obtain a proportion of the first region, the proportion of the first region being a proportion of the area of the part of the moving object region contained in the first region to an area of the moving object region.

The second region obtaining module 808 is configured to obtain a second region by adjusting a size of the first region based on the proportion of the first region.

The second region proportion obtaining module 810 is configured to obtain a proportion of the second region, the proportion of the second region being a proportion of an area of a part of the moving object region contained in the second region to the area of the moving object region.

The adjustment module 812 is configured to replace the first region with the second region, replace the proportion of the first region with the proportion of the second region, and return to performing the operation of adjusting the size of the first region based on the proportion of the first region until a number of times of the iterative adjustments reaches a threshold, and determine a region obtained by the last iterative adjustment as a target region.

In the subject detection apparatus described above, a moving object is detected on a captured first image to obtain a moving object region. A sliding box is obtained and is caused to slide on the first image to obtain a plurality of candidate regions. One of the plurality of candidate regions, which contains a part of the moving object region with a largest area among the plurality of candidate regions, is determined as a first region. A proportion of the first region is obtained, and the proportion of the first region is a proportion of the area of the part of the moving object region contained in the first region to an area of the moving object region. A size of the first region is adjusted based on the proportion of the first region to obtain a second region. A proportion of the second region is obtained, and the proportion of the second region is a proportion of an area of a part of the moving object region contained in the second region to the area of the moving object region. The first region is replaced with the second region, the proportion of the first region is replaced with the proportion of the second region, and it is returned to performing the operation of adjusting the size of the first region based on the proportion of the first region until a number of times of the iterative adjustments reaches a threshold. The one of the plurality of candidate regions, which contains the part of the moving object region with the largest area is determined as the first region, which can improve the accuracy of the determined first region. Then the iterative adjustment is performed on the first region to obtain a region with a more suitable size. The region obtained by the last iterative adjustment is determined as the target region, thereby improving the accuracy of the target region of the subject detection.

In an embodiment, the second region obtaining module 808 is further configured to obtain the second region by reducing the size of the first region in response to the proportion of the first region being greater than a proportion threshold, and obtain the second region by enlarging the size of the first region in response to the proportion of the first region being smaller than or equal to the proportion threshold.

In an embodiment, the above-mentioned sliding module 804 is further configured to determine a sliding step size for the sliding box, and obtain the plurality of candidate regions by sliding the sliding box on the first image based on the sliding step size.

In an embodiment, the above-mentioned sliding module 804 is further configured to obtain a binary image by mapping the moving object region to the first image, and obtain the plurality of candidate regions by sliding the sliding box on the binary image based on the sliding step size.

In an embodiment, each pixel value in the moving object region in the binary image is a first value. The above-mentioned sliding module 804 is further configured to determine a first sum of first values in each candidate region, and determine the candidate region with a largest first sum as the first region.

In an embodiment, the above-mentioned first region proportion obtaining module is further configured to determine a second sum of first values in the moving object region in the first image, and determine the proportion of the first region by dividing the first sum of the first region by the second sum.

In an embodiment, the above-mentioned subject detection apparatus 800 further includes an integral map obtaining module configured to determine a corresponding integral map based on the binary image. The above sliding module is further configured to obtain the plurality of candidate regions by sliding the sliding box on the integral map based on the sliding step size.

In an embodiment, the above-mentioned sliding module 804 is further configured to obtain, in response to at least two candidate regions each containing a part of the moving object region with the largest area, positions of the at least two candidate regions with the largest area, and determine the candidate region with the largest area and closest to a center of the first image as the first region based on positions of the plurality of candidate regions.

In an embodiment, the above-mentioned moving object detection module 802 is further configured to obtain a previous frame of image of the first image in response to detecting that the first image is in a shaking state, obtain a transformation matrix between the first image and the previous frame of image, adjust the previous frame of image based on the transformation matrix, and update a subject detection model based on the adjusted previous frame of image, and obtain the moving object region by detecting the moving object on the first image based on the updated subject detection model.

The division of respective modules in the above-mentioned subject detection apparatus is only used for illustration. In other embodiments, the subject detection apparatus can be divided into different modules as required to complete all or some of the functions of the above-mentioned subject detection apparatus.

Figure 9:
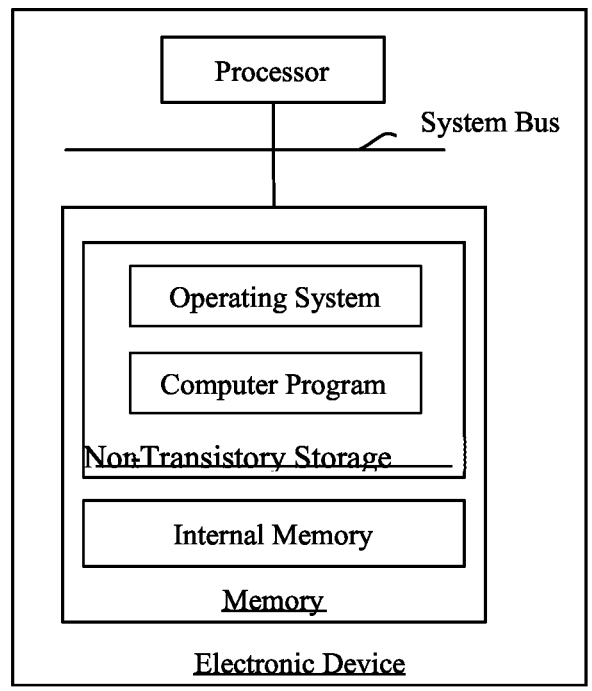
FIG. 9 is a schematic diagram showing an internal structure of an electronic device according to an embodiment.

FIG. 9 is a schematic diagram showing an internal structure of an electronic device according to an embodiment. As illustrated in FIG. 9, the electronic device includes a processor and a memory connected with each other by a system bus. The processor is configured to provide computing and control capabilities to support the operation of the entire electronic device. The memory may include a non-transitory storage medium and an internal memory. The non-transitory storage medium stores an operating system and a computer program. The computer program can be executed by the processor to implement the subject detection method provided by any of the embodiments above. The internal memory provides a cached execution environment for the operating system and the computer program in the non-transitory storage medium. The electronic device may be a mobile phone, a tablet computer, a personal digital assistant or a wearable device, and the like.

The implementation of each module in the subject detection apparatus according to the embodiments of the present disclosure may be in the form of a computer program. The computer program can run on a terminal or a server. The respective program modules constituted by the computer program can be stored in the memory of the terminal or the server. The computer program, when executed by the processor, implements the operations of the method described in any of the embodiments of the present disclosure.

Embodiments of the present disclosure further provide a non-transitory computer-readable storage medium. One or more non-transitory computer-readable storage media containing computer-executable instructions, when the computer-executable instructions are executed by one or more processors, cause the one or more processors to implement the operations of the subject detection method.

A computer program product including instructions, when run on a computer, causes the computer to implement the subject detection method.

Any reference to a memory, storage, database, or other medium as used in embodiments of the present disclosure may include a non-transitory memory and/or a transitory memory. A suitable non-transitory memory may include a Read Only Memory (ROM), a Programmable ROM (PROM), an Electrically Programmable ROM (EPROM), an Electrically Erasable Programmable ROM (EEPROM), or a flash memory. The transitory memory may include a Random Access Memory (RAM), which acts as an external cache memory. As illustration but not limitation, RAM is available in various forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Memory Bus Dynamic RAM (DRDRAM), and a Memory Bus Dynamic RAM (RDRAM).

The above-mentioned embodiments only represent several embodiments of the present disclosure, and the descriptions thereof are relatively specific and detailed, but should not be construed as a limitation of the scope of the present disclosure. It should be pointed out that for those of ordinary skill in the art, without departing from the concept of the present disclosure, several modifications and improvements can be made and are encompassed by the protection scope of the present disclosure as defined by the claims as attached.

What is claimed is:

1. A subject detection method, comprising:
    obtaining a moving object region by detecting a moving object on a captured first image;

obtaining a sliding box, obtaining a plurality of candidate regions by sliding the sliding box on the first image, and determining a first region, the first region being one of the plurality of candidate regions and comprising a part of the moving object region with a largest area among the plurality of candidate regions;

obtaining a proportion of the first region, the proportion of the first region being a proportion of the area of the part of the moving object region comprised in the first region to an area of the moving object region;

obtaining a second region by adjusting a size of the first region based on the proportion of the first region;

obtaining a proportion of the second region, the proportion of the second region being a proportion of an area of a part of the moving object region comprised in the second region to the area of the moving object region; and replacing the first region with the second region, replacing the proportion of the first region with the proportion of the second region, returning to performing the operation of adjusting the size of the first region based on the proportion of the first region until a number of times of the iterative adjustments reaches a threshold, and determining a region obtained by the last iterative adjustment as a target region.

2. The method according to claim 1, wherein said obtaining the second region by adjusting the size of the first region based on the proportion of the first region comprises:

obtaining the second region by reducing the size of the first region in response to the proportion of the first region being greater than a proportion threshold; and obtaining the second region by enlarging the size of the first region in response to the proportion of the first region being smaller than or equal to the proportion threshold.

3. The method according to claim 1, wherein said obtaining the plurality of candidate regions by sliding the sliding box on the first image comprises:

determining a sliding step size for the sliding box; and obtaining the plurality of candidate regions by sliding the sliding box on the first image based on the sliding step size.

4. The method according to claim 3, wherein said obtaining the plurality of candidate regions by sliding the sliding box on the first image based on the sliding step size comprises:

obtaining a binary image by mapping the moving object region to the first image; and obtaining the plurality of candidate regions by sliding the sliding box on the binary image based on the sliding step size.

5. The method according to claim 4, wherein each pixel value in the moving object region in the binary image is a first value, and said determining the first region comprises:

determining a first sum of first values in each candidate region; and determining the candidate region with a largest first sum as the first region.

6. The method according to claim 5, wherein said obtaining the proportion of the first region comprises:

determining a second sum of first values in the moving object region in the first image; and determining the proportion of the first region by dividing the first sum of the first region by the second sum.

7. The method according to claim 4, further comprising determining a corresponding integral map based on the binary image, wherein said obtaining the plurality of candidate regions by sliding the sliding box on the binary image based on the sliding step size comprises:

obtaining the plurality of candidate regions by sliding the sliding box on the integral map based on the sliding step size.

8. The method according to claim 1, wherein said determining the first region comprises:

in response to at least two candidate regions each containing a part of the moving object region with the largest area, obtaining positions of the at least two candidate regions with the largest area; and determining, based on positions of the plurality of candidate regions, the candidate region with the largest area and closest to a center of the first image as the first region.

9. The method according to claim 1, wherein said obtaining the moving object region by detecting the moving object on the captured first image comprises:

obtaining a previous frame of image of the first image in response to detecting that the first image is in a shaking state;

obtaining a transformation matrix between the first image and the previous frame of image;

adjusting the previous frame of image based on the transformation matrix; and updating a subject detection model based on the adjusted previous frame of image, and obtaining the moving object region by detecting the moving object on the first image based on the updated subject detection model.

10. An electronic device, comprising:

a memory having a computer program stored thereon; and a processor, wherein the computer program, when executed by the processor, causes the processor to:

obtain a moving object region by detecting a moving object on a captured first image;

obtain a sliding box, obtain a plurality of candidate regions by sliding the sliding box on the first image, and determine a first region, the first region being one of the plurality of candidate regions and comprising a part of the moving object region with a largest area among the plurality of candidate regions;

obtain a proportion of the first region, the proportion of the first region being a proportion of the area of the part of the moving object region comprised in the first region to an area of the moving object region;

obtain a second region by adjusting a size of the first region based on the proportion of the first region;

obtain a proportion of the second region, the proportion of the second region being a proportion of an area of a part of the moving object region comprised in the second region to the area of the moving object region; and replace the first region with the second region, replace the proportion of the first region with the proportion of the second region, return to performing adjusting the size of the first region based on the proportion of the first region until a number of times of the iterative adjustments reaches a threshold, and determine a region obtained by the last iterative adjustment as a target region.

11. The electronic device according to claim 10, wherein said obtaining the second region by adjusting the size of the first region based on the proportion of the first region comprises:

obtaining the second region by reducing the size of the first region in response to the proportion of the first region being greater than a proportion threshold; and obtaining the second region by enlarging the size of the first region in response to the proportion of the first region being smaller than or equal to the proportion threshold.

12. The electronic device according to claim 10, wherein said obtaining the plurality of candidate regions by sliding the sliding box on the first image comprises:
   determining a sliding step size for the sliding box; and
   obtaining the plurality of candidate regions by sliding the sliding box on the first image based on the sliding step size.

13. The electronic device according to claim 12, wherein said obtaining the plurality of candidate regions by sliding the sliding box on the first image based on the sliding step size comprises:
   obtaining a binary image by mapping the moving object region to the first image; and
   obtaining the plurality of candidate regions by sliding the sliding box on the binary image based on the sliding step size.

14. The electronic device according to claim 13, wherein each pixel value in the moving object region in the binary image is a first value, and said determining the first region comprises:
   determining a first sum of first values in each candidate region; and
   determining the candidate region with a largest first sum as the first region.

15. The electronic device according to claim 14, wherein said obtaining the proportion of the first region comprises:
   determining a second sum of first values in the moving object region in the first image; and
   determining the proportion of the first region by dividing the first sum of the first region by the second sum.

16. The electronic device according to claim 13, wherein the computer program, when executed by the processor, further causes the processor to determine a corresponding integral map based on the binary image,
   wherein said obtaining the plurality of candidate regions by sliding the sliding box on the binary image based on the sliding step size comprises obtaining the plurality of candidate regions by sliding the sliding box on the integral map based on the sliding step size.

17. The electronic device according to claim 10, wherein said determining the first region comprises:
   in response to at least two candidate regions each containing a part of the moving object region with the largest area, obtaining positions of the at least two candidate regions with the largest area; and
   determining, based on positions of the plurality of candidate regions, the candidate region with the largest area and closest to a center of the first image as the first region.

18. The electronic device according to claim 10, wherein said obtaining the moving object region by detecting the moving object on the captured first image comprises:

obtaining a previous frame of image of the first image in response to detecting that the first image is in a shaking state;
   obtaining a transformation matrix between the first image and the previous frame of image;
   adjusting the previous frame of image based on the transformation matrix; and
   updating a subject detection model based on the adjusted previous frame of image, and obtaining the moving object region by detecting the moving object on the first image based on the updated subject detection model.

19. A non-transitory computer-readable storage medium having a computer program stored thereon, wherein the computer program, when executed by a processor, causes the processor to:
   obtain a moving object region by detecting a moving object on a captured first image;
   obtain a sliding box, obtain a plurality of candidate regions by sliding the sliding box on the first image, and determine a first region, the first region being one of the plurality of candidate regions and comprising a part of the moving object region with a largest area among the plurality of candidate regions;
   obtain a proportion of the first region, the proportion of the first region being a proportion of the area of the part of the moving object region comprised in the first region to an area of the moving object region;
   obtain a second region by adjusting a size of the first region based on the proportion of the first region;
   obtain a proportion of the second region, the proportion of the second region being a proportion of an area of a part of the moving object region comprised in the second region to the area of the moving object region; and
   replace the first region with the second region, replace the proportion of the first region with the proportion of the second region, return to performing the operation of adjusting the size of the first region based on the proportion of the first region until a number of times of the iterative adjustments reaches a threshold, and determine a region obtained by the last iterative adjustment as a target region.

20. The non-transitory computer-readable storage medium according to claim 19, wherein said obtaining the second region by adjusting the size of the first region based on the proportion of the first region comprises:
   obtaining the second region by reducing the size of the first region in response to the proportion of the first region being greater than a proportion threshold; and
   obtaining the second region by enlarging the size of the first region in response to the proportion of the first region being smaller than or equal to the proportion threshold.

* * * * *